(12) United States Patent
Elkins et al.

(10) Patent No.: US 11,244,404 B2
(45) Date of Patent: Feb. 8, 2022

(54) VIN BASED INSURANCE CLAIM SYSTEM

(71) Applicant: Audatex North America, Inc., Addison, TX (US)

(72) Inventors: Tanya Elkins, Milwaukie, OR (US); Sergey Gorelov, West Linn, OR (US); Daryoush Joobbani, Tigard, OR (US)

(73) Assignee: AUDATEX NORTH AMERICA, LLC, Westlake, TX (US)

( * ) Notice: Subject to any disclaimer, the term of this patent is extended or adjusted under 35 U.S.C. 154(b) by 204 days.

(21) Appl. No.: 16/684,165

(22) Filed: Nov. 14, 2019

(65) Prior Publication Data
US 2020/0082473 A1 Mar. 12, 2020

Related U.S. Application Data

(63) Continuation of application No. 15/937,659, filed on Mar. 27, 2018, now Pat. No. 10,482,541, which is a
(Continued)

(51) Int. Cl.
*G06Q 40/08* (2012.01)
*G06Q 40/00* (2012.01)

(52) U.S. Cl.
CPC ............. *G06Q 40/08* (2013.01); *G06Q 40/00* (2013.01)

(58) Field of Classification Search
CPC ................................ G06Q 40/08; G06Q 40/00
See application file for complete search history.

(56) References Cited

U.S. PATENT DOCUMENTS 5,454,672 A 10/1995 Halpin
5,777,451 A 7/1998 Kobayashi
(Continued)

FOREIGN PATENT DOCUMENTS

CN 101577653 A * 11/2009

OTHER PUBLICATIONS

Lawrence S. Powell, Kathleen A. McCullough, Patrick F. Maroney and Cassandra R. Cole, Consumer Choice in Auto Repair: The Politics and Economics of Automobile Insurance Repair Practices, Sep. 2010, National Association of Mutual Insurance companies, web, 2-24 (Year: 2010).*

(Continued)

*Primary Examiner* — I Jung Liu
(74) *Attorney, Agent, or Firm* — Baker Botts, LLP

(57) ABSTRACT

An insurance claim system that can display vehicle identification key information and vehicle option, package, engine, transmission, paint, production date information provided from multiple different sources. The system can perform a method that includes displaying at least one insurance claim with at least one vehicle description, a plurality of vehicle options, and a VIN field. A VIN is entered into the VIN field, which is decoded to determine vehicle information and vehicle option information. One or more vehicle options displayed by the client computer are selected with the vehicle option information, and the selected vehicle options are modified with supplemental vehicle options information provided by an OEM source. Modifying the vehicle options with the information provided by the OEM source improves the accuracy of the options information selected on the insurance claim page. Maintaining the additional options provided by the VIN decode allows an operator to select/de-select options added or removed after manufacture of the vehicle.

29 Claims, 11 Drawing Sheets

Related U.S. Application Data continuation of application No. 13/440,751, filed on Apr. 5, 2012, now Pat. No. 9,959,575.

(56) References Cited

U.S. PATENT DOCUMENTS

| | | | |
|---|---|---|---|
| 5,838,251 A | | 11/1998 | Brinkmeyer |
| 5,950,169 A | * | 9/1999 | Borghesi ................ G06Q 40/08 705/4 |
| 2006/0095302 A1 | * | 5/2006 | Vahidi .................... G06Q 40/08 705/4 |
| 2008/0103785 A1 | | 5/2008 | Logan |
| 2012/0123951 A1 | | 5/2012 | Hyatt et al. |

OTHER PUBLICATIONS

Lawrence S. Powell et al., "Consumer Choice in Auto Repair: The Politics and Economics of Automobile Insurance Repair Practices" *National Assocciation of Mutual Insurance Companies*, web, 2-24.

\* cited by examiner

VIN BASED INSURANCE CLAIM SYSTEM

RELATED APPLICATION INFORMATION

This application is a continuation application under 35 U.S.C. § 120 of U.S. application Ser. No. 15/937,659, filed Mar. 27, 2018, which is a continuation application under 35 U.S.C. § 120 of U.S. application Ser. No. 13/440,751, filed Apr. 5, 2012 and entitled VIN Based Insurance Claim System, the contents of which are incorporated herein by reference in their entirety.

BACKGROUND OF THE INVENTION

1. Field of the Invention

The subject matter disclosed generally relates to a method and system for generating an insurance claim for a vehicle.

2. Background Information

When a vehicle such as an automobile is damaged the owner may file a claim with an insurance carrier. A representative typically inspects the vehicle to determine the amount of damage and the costs required to repair the automobile. The owner of the vehicle or the vehicle repair facility may receive a check equal to the estimated cost of the repairs. If the repair costs exceed the value of the automobile, or a percentage of the car's value, the representative may "total" the vehicle. The owner may then receive a check based on the value of the automobile.

The repair costs and other information may be entered by the representative into an estimate report. After inspection the representative sends the estimate report to a home office for approval. To improve the efficiency of the claims process there have been developed computer systems and accompanying software that automate the estimate process. By way of example, the assignee or the present invention. Audatex, Inc. ("Audatex") provides a software product under the trademark Audatex Estimating/Autosource that allows a representative to enter claim data. The Audatex software includes a VIN field that allows the user to enter the VIN (vehicle identification number) of the damaged vehicle. The VIN can be decoded to determine the matching vehicle(s). The vehicle identification process can also provide information regarding the standard options for the vehicle. Vehicle information can be also retrieved from a manufacturer proprietary vehicle database, also referred to as the vehicle identification key. Accurate vehicle information is essential to obtaining accurate, repair cost and vehicle valuation data.

A vehicle may be modified by a third party such as a dealer or the owner so that the options information provided by the VIN decode process and/or vehicle identification key information is incomplete. This requires the user of the system, such as an insurance representative, to selector or de-select the different options of the vehicle in the claim system. This can be a time consuming exercise that is ripe for error.

In addition, to the traditional claim inspection process where a representative directly enters the vehicle's physical inspection information into a claims application to produce an estimate or vehicle valuation request Audatex has the ability to provide a vehicle identification key (vehicle description, engine, transmission, options, packages, manufacture build date and paint). A representative will utilize this report as part of a physical inspection process to verify the loss vehicle's information. Once the physical inspection has been completed the vehicle inspection details can then be used to complete the vehicle information process within Audatex or another vendor's application for an estimate and/or vehicle valuation.

BRIEF SUMMARY OP THE INVENTION

An apparatus and method that includes displaying at least one insurance policy with at least one vehicle description, a plurality of vehicle options, and a Vehicle Identification Number (VIN) field. A VIN can be entered, which is decoded to determine key vehicle identification and option information. One or more vehicle options displayed by the client computer can be selected with the vehicle option information, and the selected vehicle options are modified with supplemental vehicle options information provided by an OEM source.

BRIEF DESCRIPTION OF THE DRAWINGS

FIGS. 3A and B are illustrations of a vehicle identification page with different vehicle information fields;

FIGS. 5A-D are illustrations showing the linking of OEM data with vehicle description keys.

DETAILED DESCRIPTION

Disclosed is an insurance application system that can display vehicle information and vehicle option information provided by two different sources. The system can perform a method that includes displaying at least one insurance vehicle identification page with at least one vehicle description, a plurality of vehicle options, and a VIN field. A VIN is entered into the VIN field, which is decoded to determine vehicle information and vehicle option information. One or more vehicle options displayed by a client computer can be selected with the vehicle option information, and the selected vehicle options can be modified with supplemental vehicle options information provided by an OEM source. An OEM source may include B2B, Direct Batch, Surrogate/3rd party or B2B Batch (OEM B2B/trx based; OEM data dumps; 3rd party B2B/trx based; 3rd party data dumps). Modifying the vehicle options with the information provided by the OEM source improves the accuracy of the vehicle description, engine, transmission, options, and packages information selected on the insurance vehicle identification page. Displaying the additional option provided by the VIN decode allows an representative to select/de-select options added or removed after manufacture of the vehicle.

Figure 1:
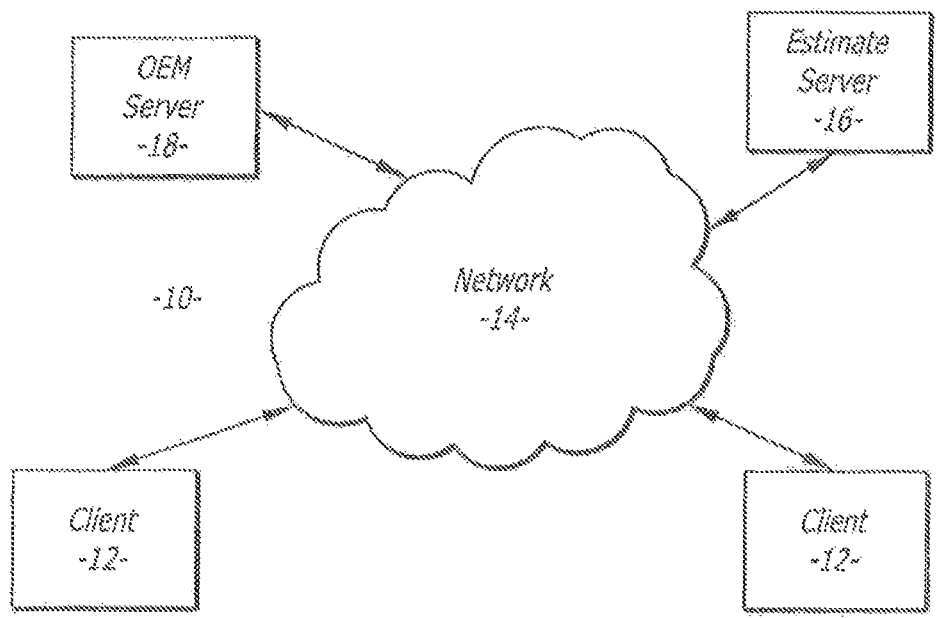
FIG. 1 is a schematic of a network system that can be used to generate an insurance inspection report for a damaged vehicle.

Referring to the drawings more particularly by reference numbers, FIG. 1 shows a system 10 that can be used to generate a repair cost estimate and/or vehicle valuation for an insurance claim of a vehicle. The system 10 includes at least one client 12 that is connected to an electronic communication network 14. The electronic communication network 14 may be a wide area network (WAN) such as the Internet. Accordingly, communication may be transmitted through the network 14 in TCP/IP format. The client could be any type of device that can access the network 14.

The system 10 may further include an claim server 16 connected to the network 14. The claim server 16 may provide a web based portal that provides access to a repair cost estimate and/or a vehicle valuation web site. The web site may provide one or more web pages that can be used by a representative to generate a repair cost estimate and/or a vehicle valuation. By way of example, the representative may utilize the web pages to determine the estimate and/or a vehicle valuation of a vehicle or claims adjuster submitting vehicle information on a theft claim, or a policy system that requires vehicle data to provide a price quote. Although one claim server 16 is shown, it is to be understood that the claim server may include two or more separate servers including a web server and an application server that together pertain the claim functions.

The system also includes an OEM server 18 that can be coupled to the claim server 16 and clients 12 through the network 14. The OEM server 18 contain a database that includes vehicle model information and vehicle option information. The OEM server 18 may provide vehicle model information and vehicle options information based on a VIN. Although a web based system is shown and described, it is to be understood that a non-web based system could be employed.

Figure 2:
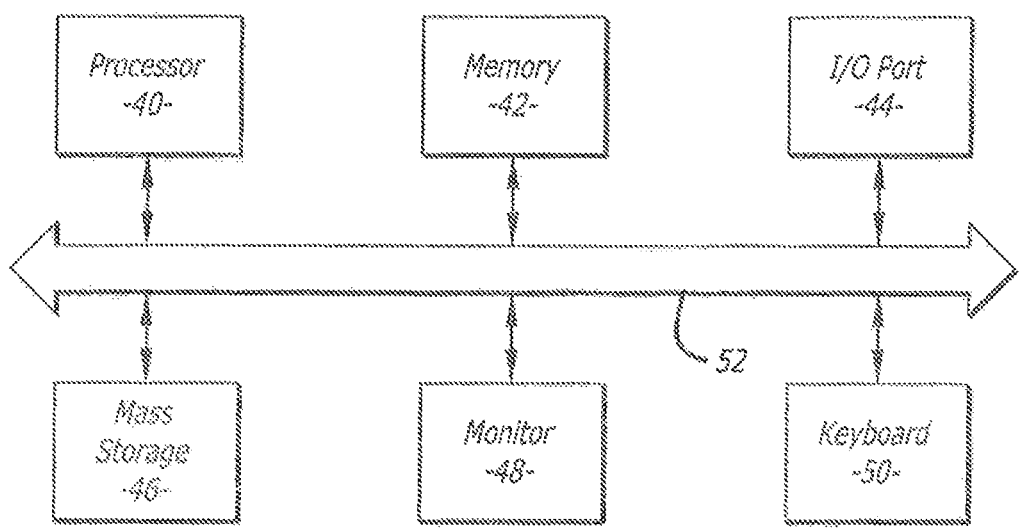
FIG. 2 is a schematic of a computer of the system.

FIG. 2 shows an embodiment of a client 12 and the servers 16 and 18. The computer 12 includes a processor 40 connected to one or more memory devices 42. The memory device 42 may include both volatile and non-volatile memory such as read only memory (ROM) or random access memory (RAM). The processor 40 is capable of operating software programs in accordance with instructions and data stored within the memory device 42.

The processor 40 may be coupled to a communication port 44, a mass storage device 46, a monitor 48 and a keyboard 50 through bus 52. The processor 40 may also be coupled to a computer mouse, a touch screen, a microphone, a speaker, an optical code reader (not shown). The communication port 44 may include an ETHERNET interface that allows data to be transmitted and received in TCP/IP format, although it is to be understood that there may be other types of communication ports. The system bus 52 may be a PCI or other conventional computer bus. The mass storage device 40 may include one or more disk drives such as magnetic or optical drives. The mass storage device 46 may also contain software that is operated by the processor 40.

Without limiting the scope of the invention the term computer reachable medium may include the memory device 42 and/or the mass storage device 46. The computer readable medium may contain software programs in binary form that can be read and interpreted by the computer. In addition to the memory device 42 and/or mass storage device 46, computer readable medium may also include a diskette, a compact disc, an integrated circuit, a cartridge, or even a remote communication of the software program. In general the servers 16 and 18 may contain more memory, additional communication ports and greater processing power than the computer 12.

The servers 16 and 18 may contain relational databases that correlate data with individual data fields and a relational database management system (RDBMS). The RDBMS of the server 16 may include a reference to a website that can be accessed by the computers 12. The website has one or more specific uniform resource locators (URL) that can be used to access the site through the network 14. The URL can be entered through a web-based application resident in the client computer 12. By way of example, the web based application may be a browser.

Figure 3A:
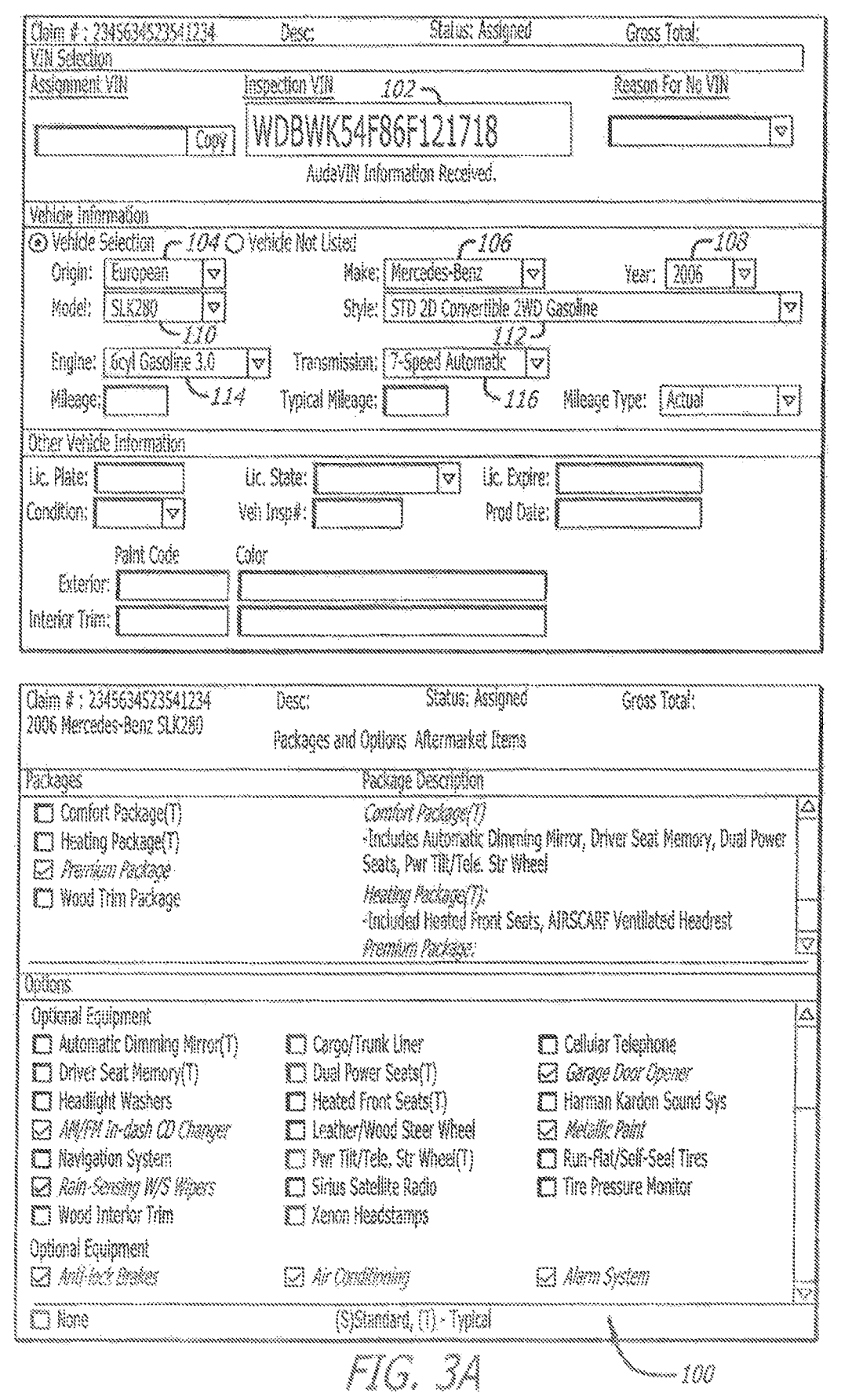
Figure 3B:
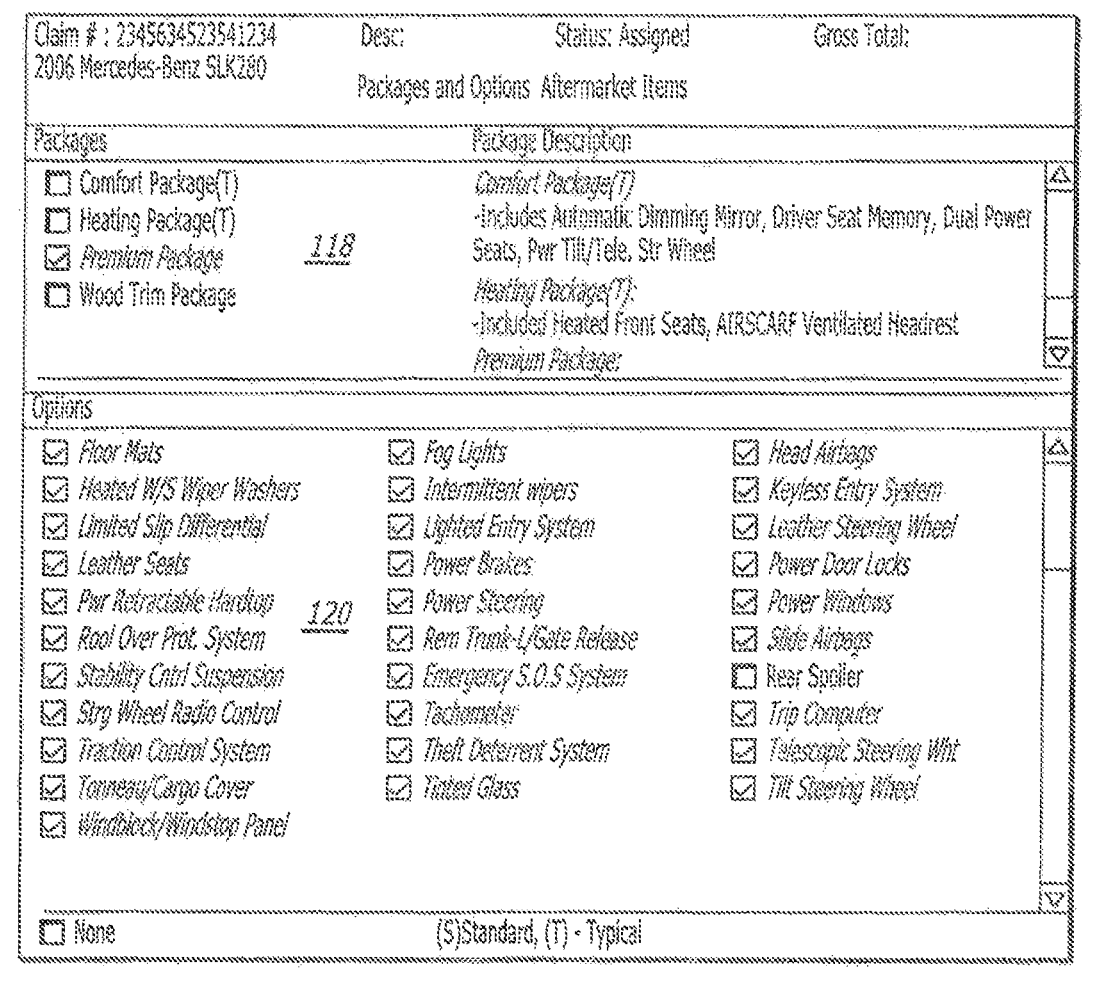

FIGS. 3A and 3B show an example of an claim page 100 with a VIN field 102 that allows a user to enter a VIN. The page 100 may include vehicle information fields, including but not limited to ORIGIN 104, MAKE 106, YEAR 108, MODEL 110, STYLE 112, ENGINE 114 and TRANSMISSION 116, exterior and interior Paint code, color, refinish type and production date fields. The page may further include vehicle packages fields 118 and vehicle options fields 120 that can be selected and deselected to indicate the options of a vehicle. Entering the VIN automatically populates certain fields of the page 100.

The basic decoding process may determine a vehicle and standard vehicle options associated with the entered VIN. The basic VIN decode can be performed by the claims server, or a separate VIN decode server. The vehicle information is automatically inserted into the page 100 as shown in FIG. 3A. Certain vehicle options are also selected as indicated by the check marks in FIG. 3B. The process also includes retrieving vehicle option information from the OEM source. The page displays the OEM vehicle option information. For example, FIG. 3B shows a REAR SPOILER field that would have been selected based on the basic VIN decode but was de-selected based on the vehicle options information provided by the OEM server. The user can further select or de-select options based on an inspection of the vehicle. The combination of VIN decoding and OEM vehicle option information provides an initial repair cost estimate or vehicle valuation that is "relatively accurate".

The basic VIN decode may generate information for more than one vehicle. For example, the basic VIN decode may generate information for both a standard package and a custom package, or for different engine sizes. The OEM vehicle information can be used to eliminate one or more pieces of the vehicle information identified in the basic VIN decode process.

Figure 4A:
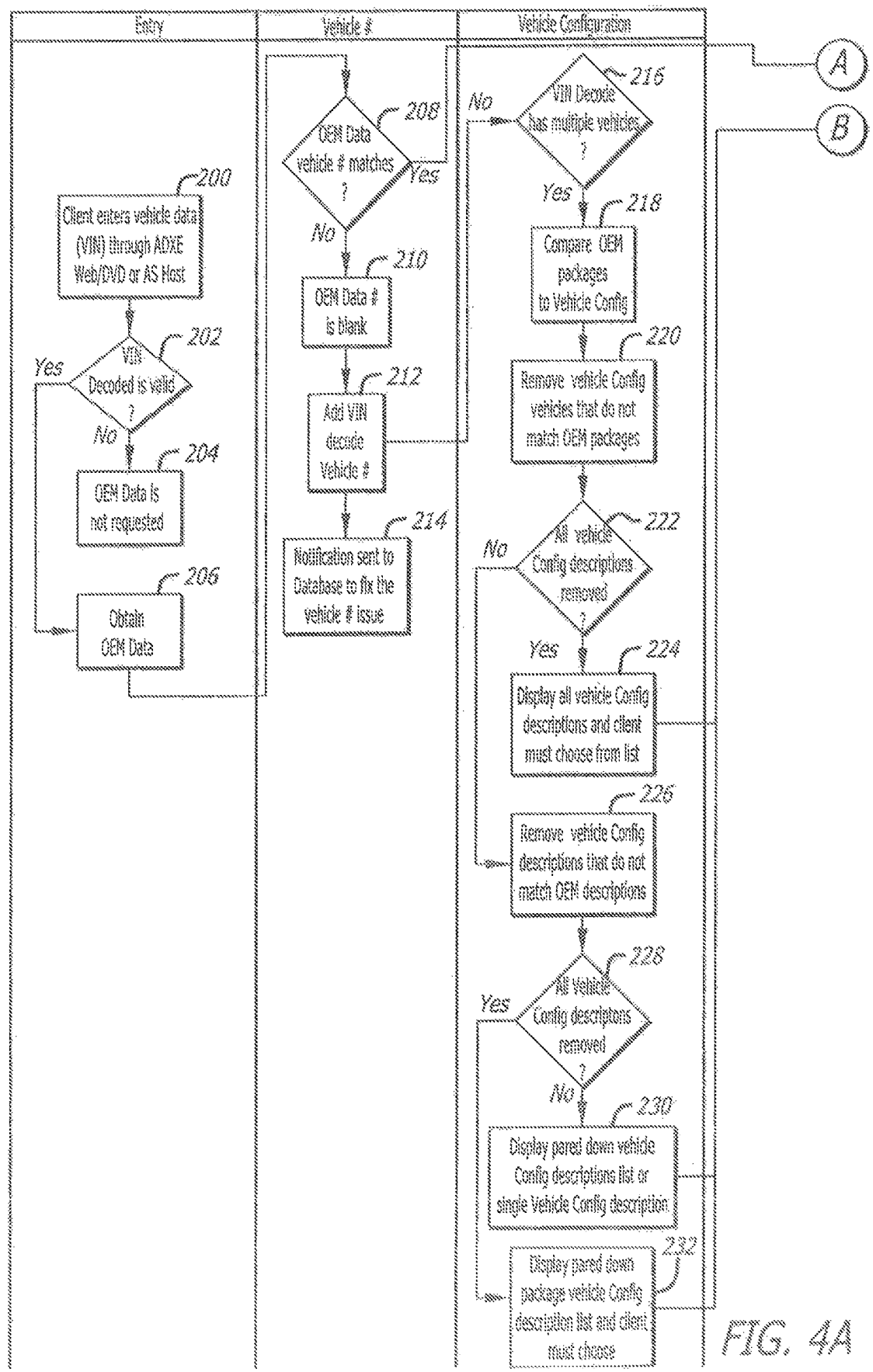
FIGS. 4A and 4B are a flowchart showing a process for automatically populating vehicle information fields based on a VIN decode, vehicle identification key, and OEM vehicle information.
Figure 4B:
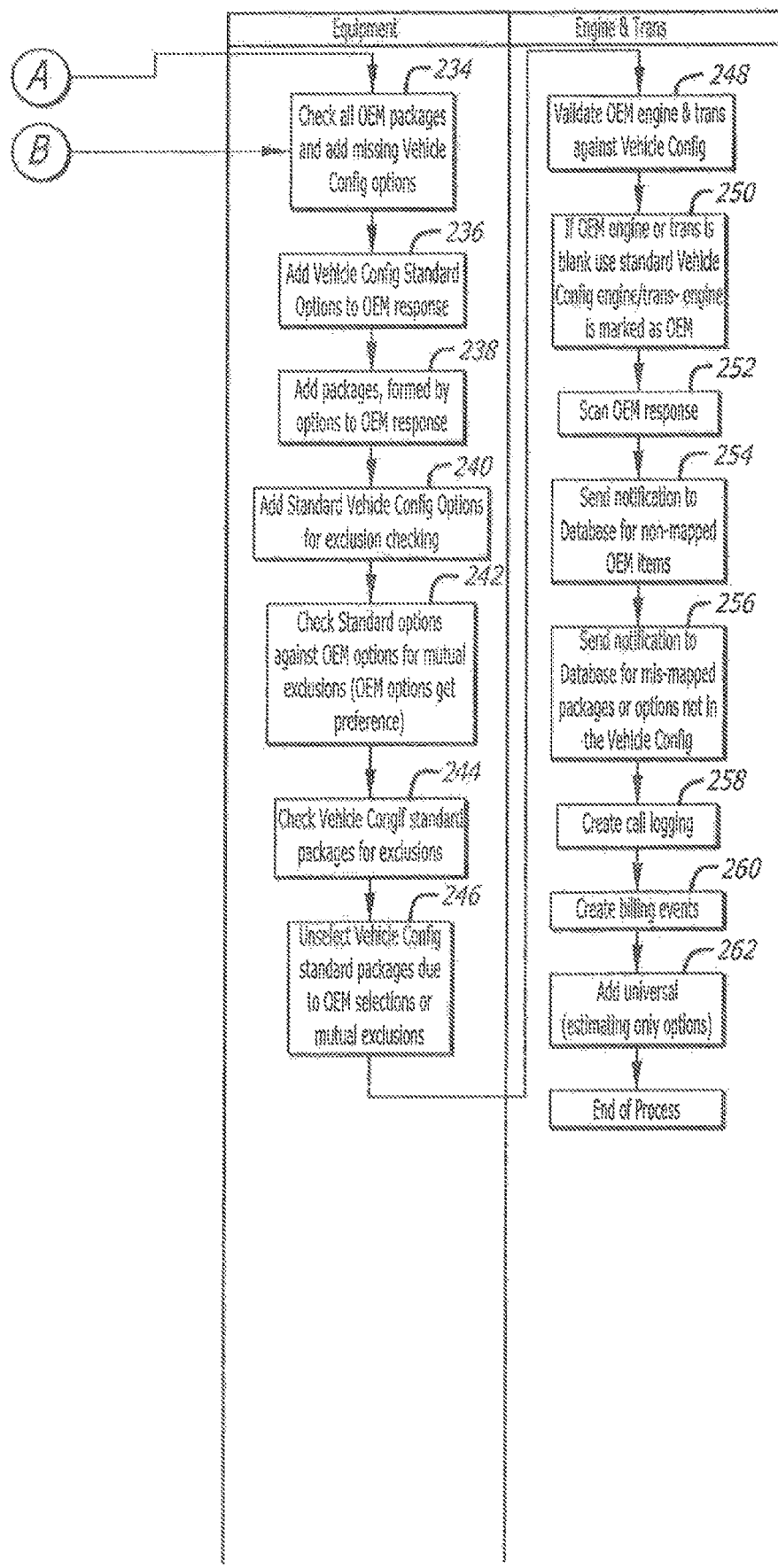

FIGS. 4A and 4B show a flowchart for the process of automatically populating the page based on the entry of a VIN. The VIM is entered and decoded in block 200. The VIN can be decoded by two different processes. By way of example, the VIN may be decoded by a process referred to as OEM decode and/or a process referred to as a basic decode. The validity of the basic VIN decode is checked in decision block 202. If the decode is invalid, OEM decode data may not be requested in block 204. If valid, OEM data for the vehicle is requested in block 206. The vehicle identification key generated by the basic decode process is compared with the OEM decode data in decision block 208. If the description and OEM data do not match then the OEM data is not used and the basic VIN decode are inserted in blocks 210 and 212, respectively. A notification can be provided in block 214.

In decision block 216, it is determined whether the basic VIN decode produced multiple vehicle identification keys. If yes, in block 218 the options and packages provided through the VIN decode are compared with the packages provided by the OEM source. In block 220 the vehicles identified by the OEM source that do not have the options and packages identified through the VIN process are removed. If this process removed all of the possible identified vehicles as determined in decision block 222 then all of the vehicle identification keys are displayed in block 224 and the user has the option of selecting from a full list of displayed descriptions. If all of the vehicle identification keys are not removed, then the vehicle identification keys that do not match the vehicle options identified by the OEM data are removed in block 226 and a pared list of vehicle identification keys are displayed in block 230. If all of the vehicle identification keys are not removed then the vehicle identification keys remaining are displayed in block 232.

The process continues to blocks 234 and 236 where the vehicle options identified by the OEM source are added to the options and packages identified in the VIN process. Packages that are formed by the added options are added to the response in block 238. The standard options identified by the OEM source are added in block 240 and a mutual exclusion check with the vehicle identification key options is performed in decision block 242. The vehicle identification key standard packages are checked for exclusions in block 244. In block 246 the process de-selects options that would have been selected by the VIN process based on the OEM source.

In block 248 the engine and transmission information produced by the vehicle identification key and OEM processes are checked. In block 250 the OEM engine and transmission is used, if blank the vehicle identification key engine and transmission is used. The response is scanned and notifications are sent in blocks 252, 254 and 256. A log and billing is created in blocks 258 and 260 and if available additional options are added in block 262 to complete the process.

Figure 5A:
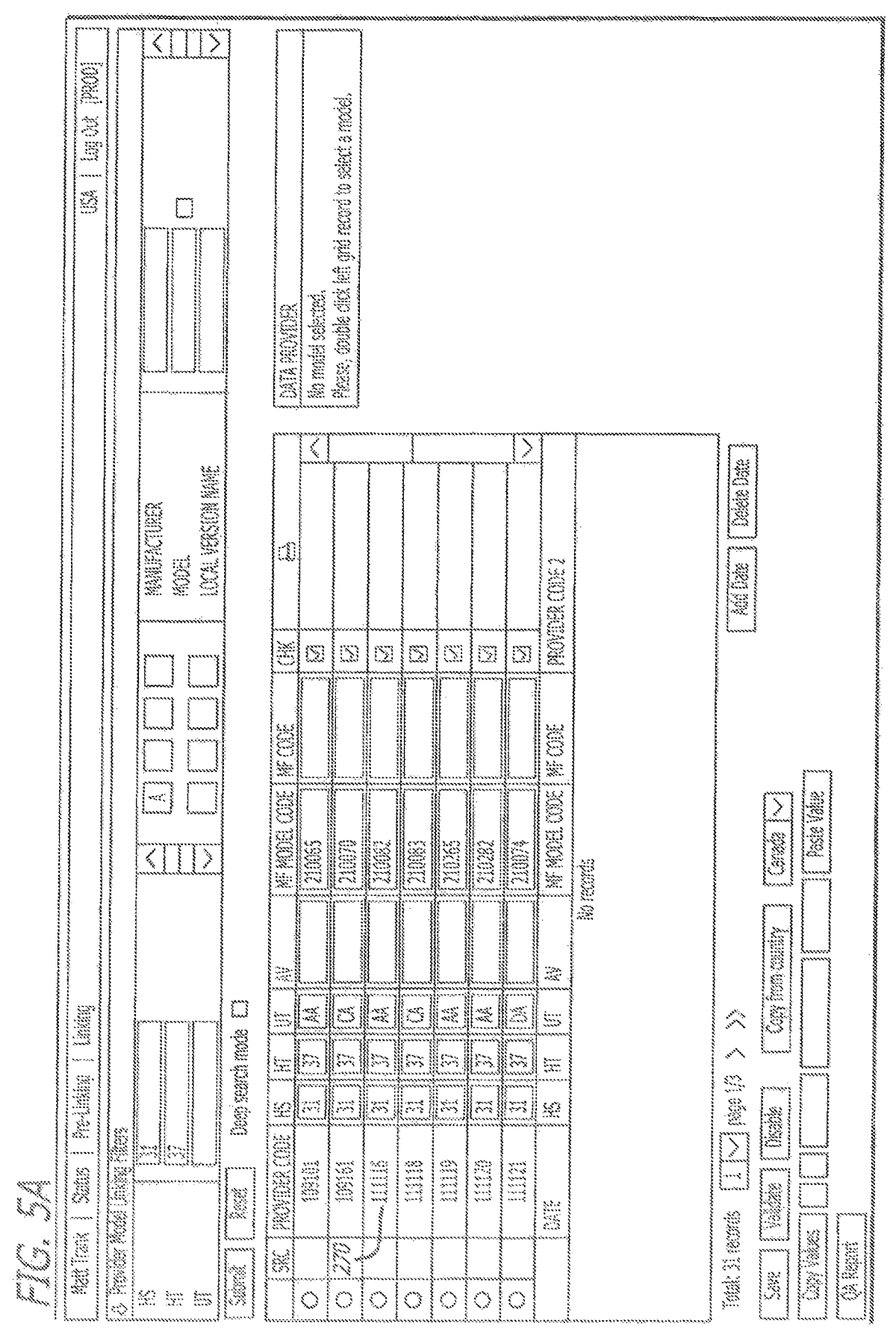
Figure 5B:
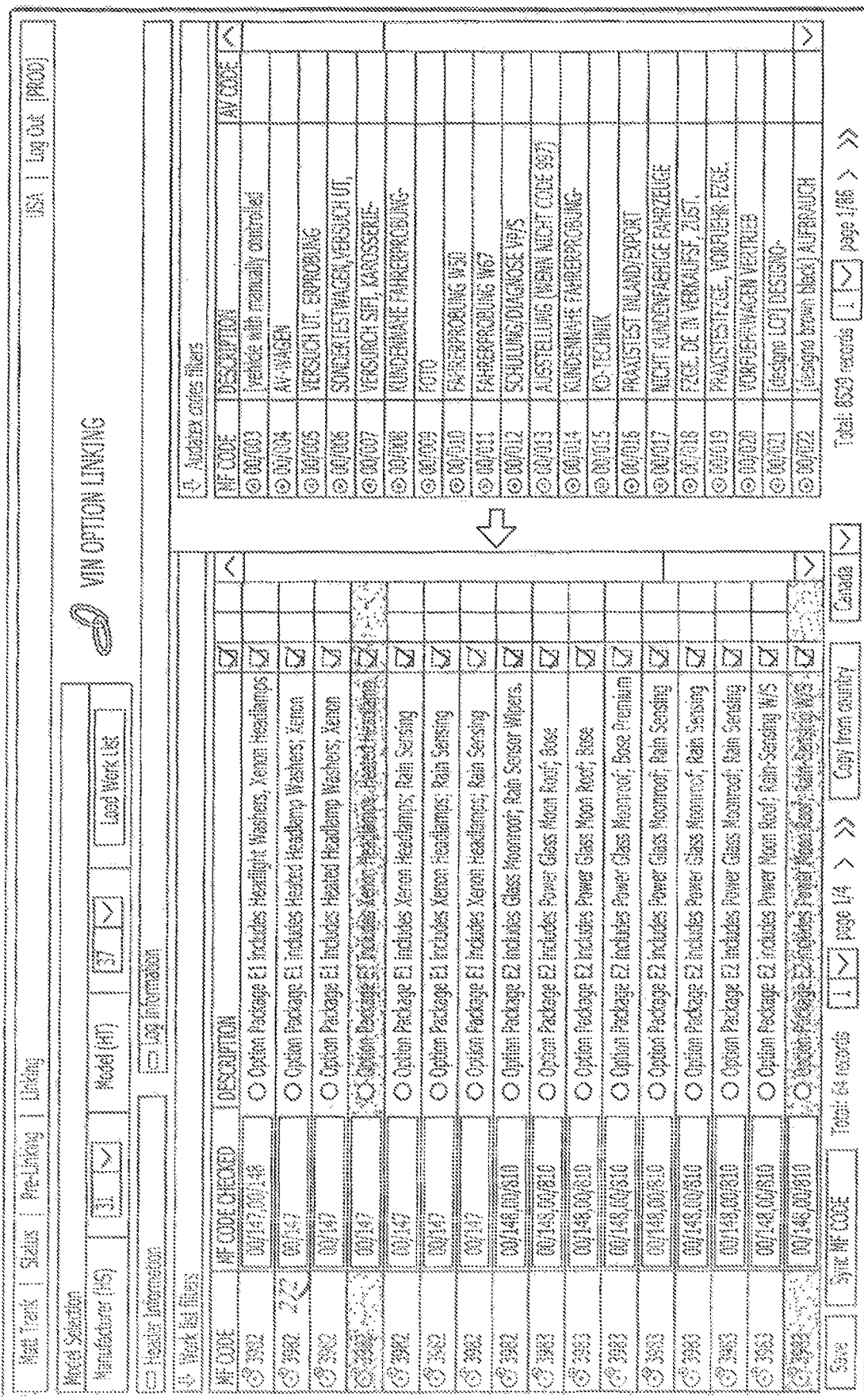
Figure 5C:
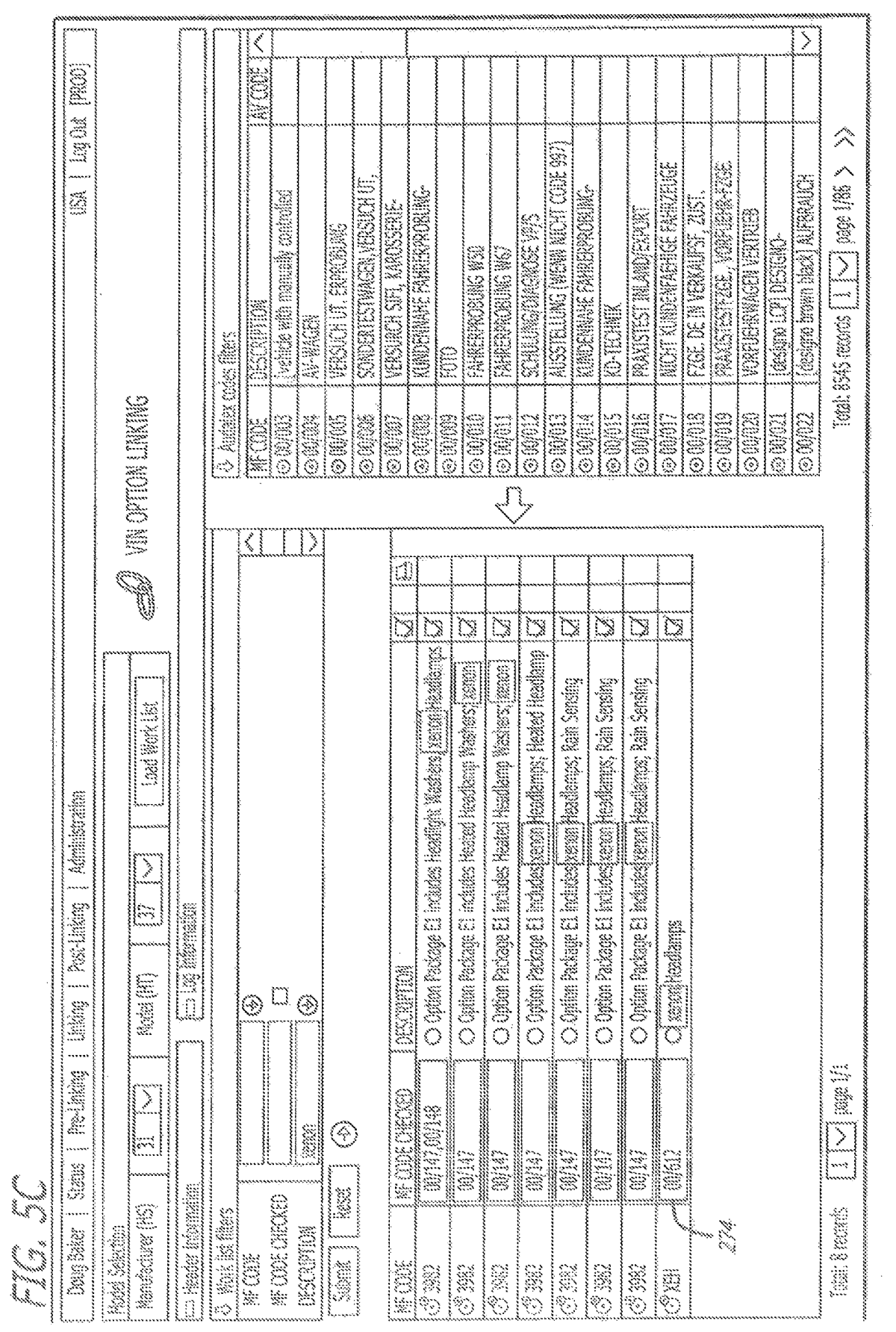
Figure 5D:
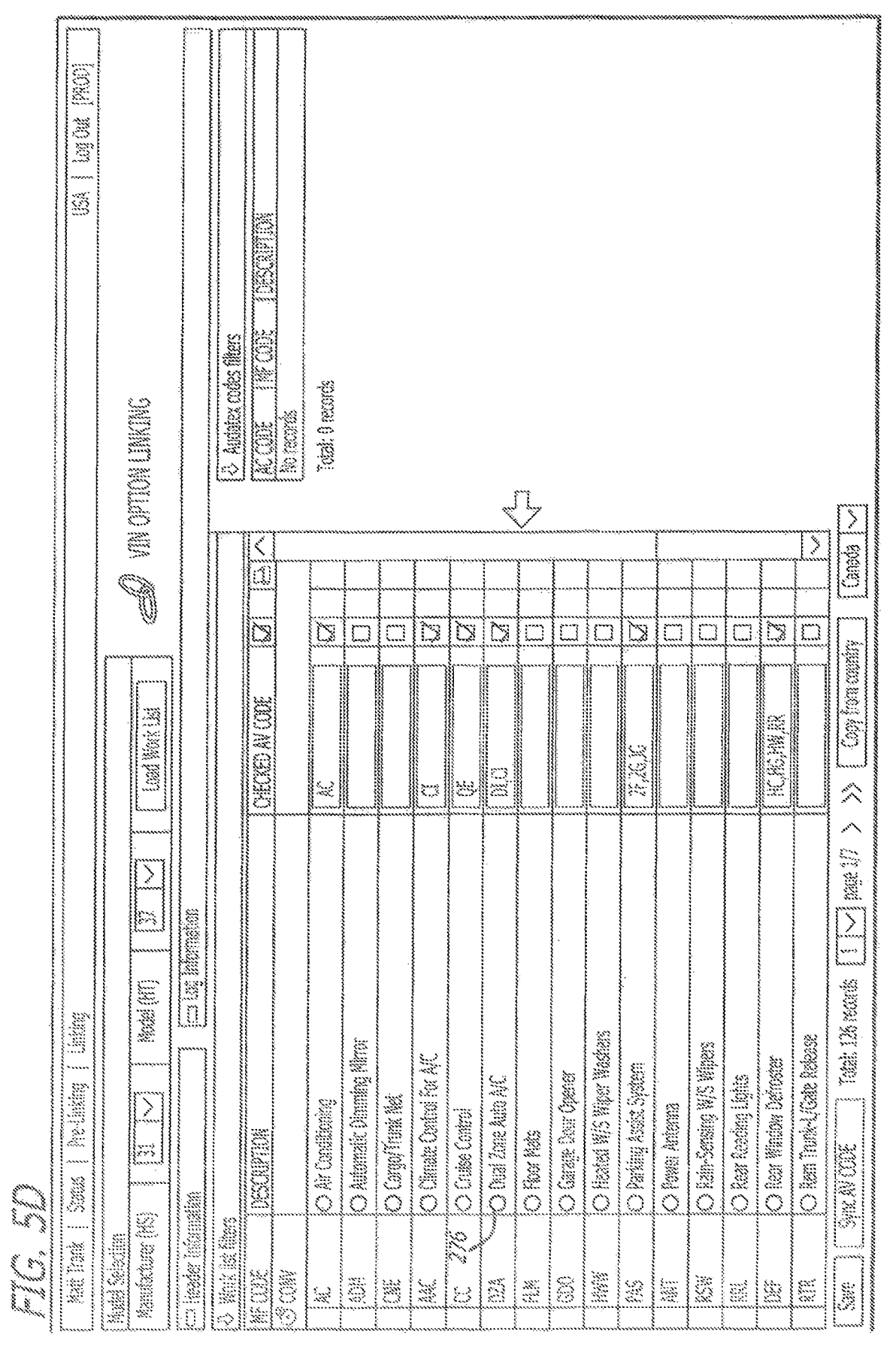

Before OEM data can be used by a client application, a linking process is utilized to map OEM data to the vehicle description keys. FIG. 5A shows an example of a linking page 270 to map OEM model numbers to vehicle description key numbers. This linking allows the vehicle identification key generated by the basic decode process to be compared with the OEM decode data in decision block 208. FIG. 5B shows an example of the linking page 272 to map OEM package codes at the make or model level to vehicle description key package names and their contents. This linking is used within blocks 218 and 234. FIG. 5C shows an example of a linking page 274 to map OEM option codes at the make or model level to vehicle description key option names which is used within blocks 242 and 246. FIG. 5D shows an example of a linking page 276 to map vehicle description key option codes at the make or model level to options that impact labor and/or part numbers on an estimate which is used within block 262.

Figure 6:
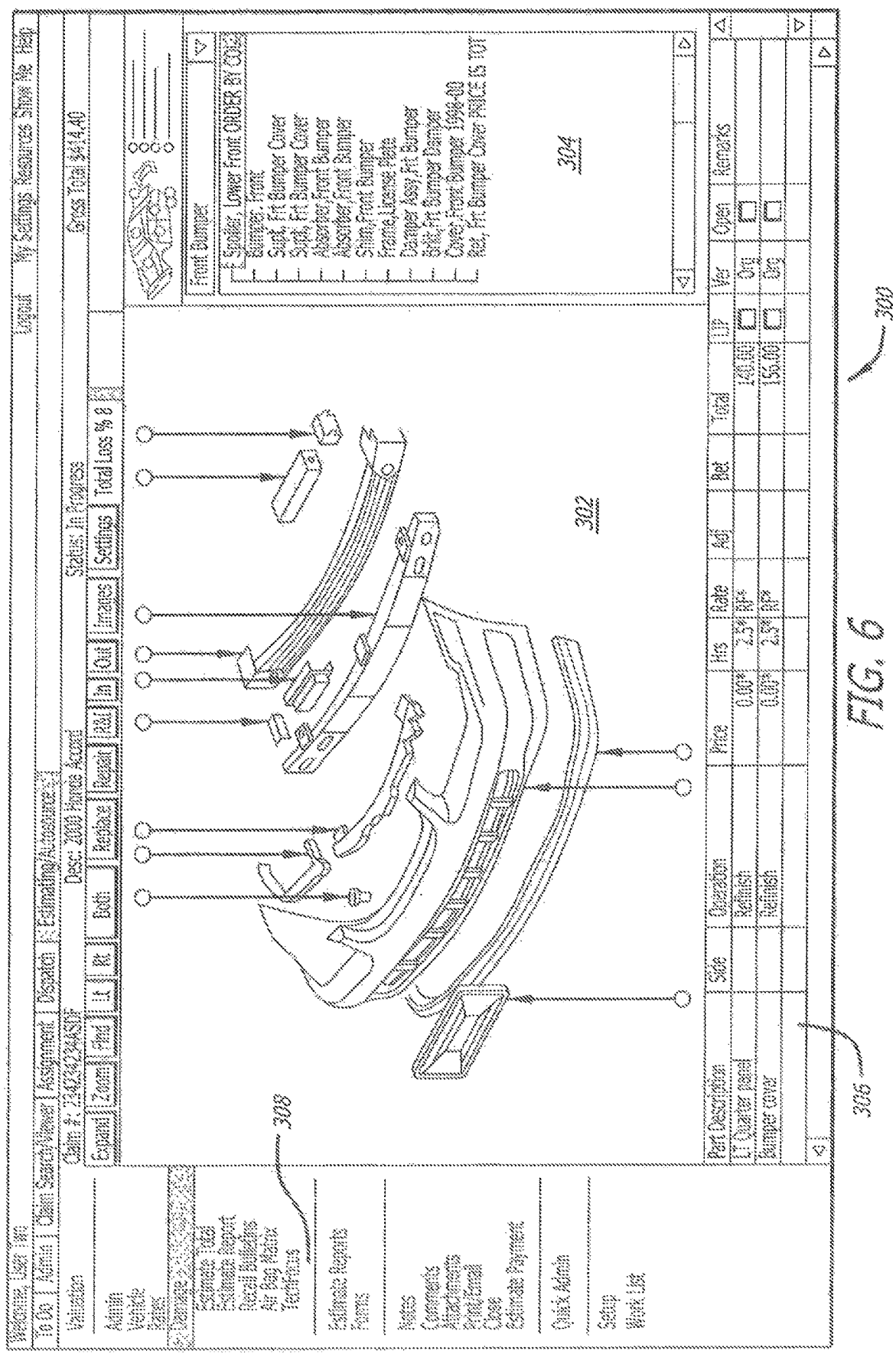
FIG. 6 is a graphical user interface used to enter and/or select damaged pans of a vehicle; and, FIG. 7 is a graphical user interface that provides a running cost total for the repair estimate of the damaged vehicle.
Figure 7:
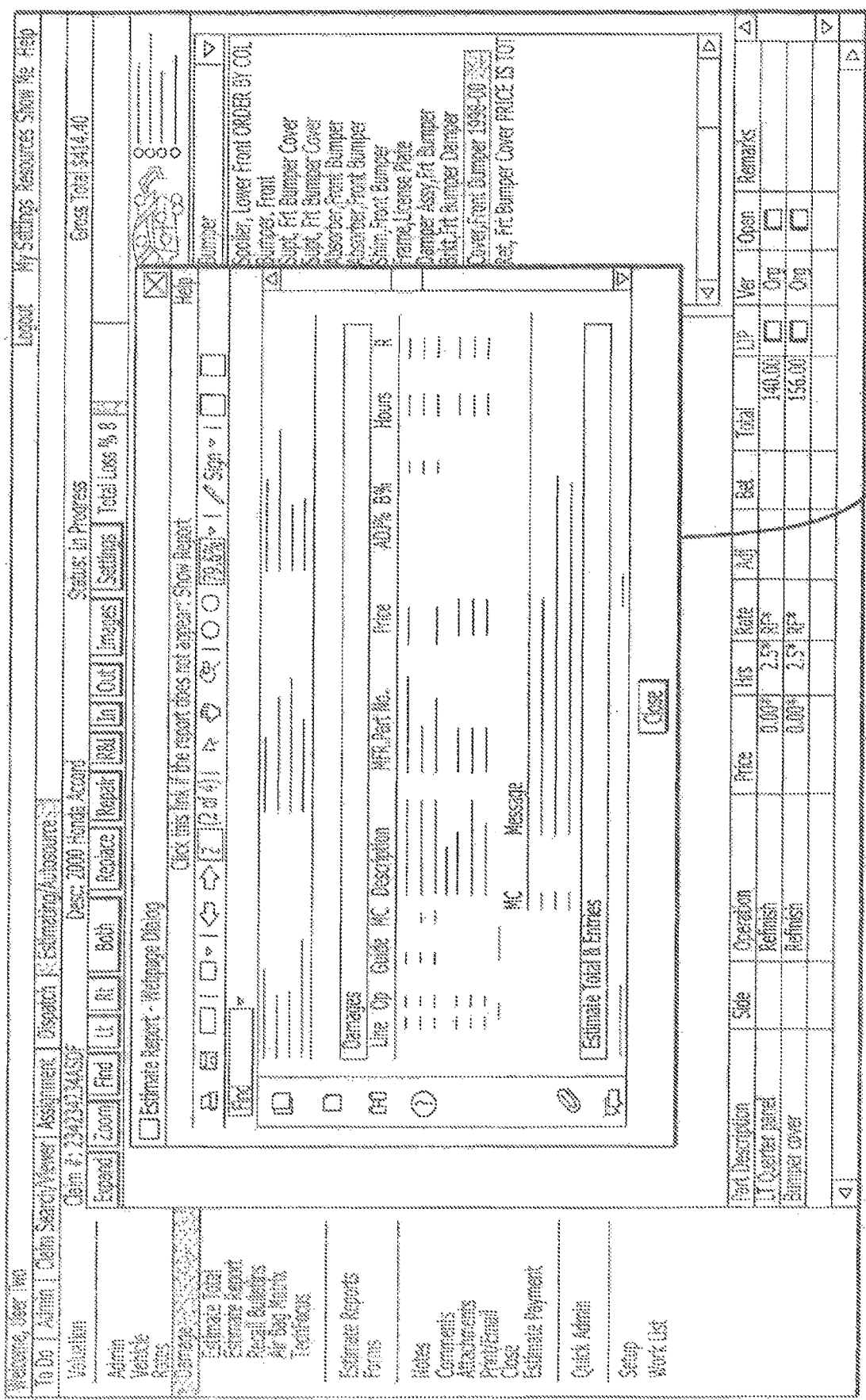

The representative may enter and/or select damaged parts for the vehicle. FIG. 6 shows an example of an estimating page 300 that allows the user to enter and/or select damaged parts of a vehicle. The page 300 may include a graphical section 302 that can be selected by the representative and a text section 304 that lists a plurality of selectable parts for the vehicle. The parts that are selected to be replaced or repaired can be listed in section 306. An estimate page can be displayed by selecting the "Estimate Total" link 308 shown in FIG. 6 FIG. 7 shows a page 320 that displays a running cost total of the estimated damage of the vehicle. The process may have a feature (not shown) that provides a warning to the representative that the cost total exceeds a "totaled" value at which point the representative may discontinue the process and request a vehicle valuation. After all of the parts to be repaired or damaged are selected the representative may obtain a final repair cost estimate and/or vehicle valuation.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method comprising:
receiving a Vehicle Identification Number for a vehicle;
generating vehicle information data using the Vehicle Identification Number, wherein the vehicle information data comprises at least the make of the vehicle, the model of the vehicle, and at least one option package associated with the make and model of the vehicle;
generating a request for Original Equipment Manufacturer data regarding the vehicle using the Vehicle Identification Number;
receiving the Original Equipment Manufacturer data, the Original Equipment Manufacturer data comprising a plurality of Original Equipment Manufacturer codes wherein ones of the plurality of Original Equipment Manufacturer codes each represent options that were installed by an Original Equipment Manufacturer when manufacturing the vehicle;
causing to be displayed on a display an identification of the make of the vehicle and the model of the vehicle;
causing to be displayed on the display a plurality of vehicle option fields, wherein at least some of the vehicle option fields each comprise at least a selectable indicator and an option description, where the selectable indicator is operable to visually indicate a selected or deselected state for a vehicle option, and wherein the option description comprises a description of at least one option that the Original Equipment Manufacturer offered for the make and model of the vehicle;
wherein the display visually indicates for ones of the vehicle option fields that the selectable indicator is in the selected state where the Original Equipment Manufacturer data indicates that the option corresponding to the particular vehicle option field was installed on the vehicle by the Original Equipment Manufacturer when manufacturing the vehicle, wherein the option corresponding to the particular vehicle option field is indicated as present on the vehicle by at least one of the Original Equipment Manufacturer codes;
wherein the display visually indicates for ones of the vehicle option fields that the selectable indicator is in the deselected state where the Original Equipment Manufacturer data indicates that the option corresponding to the particular vehicle option field was not installed on the vehicle by the Original Equipment Manufacturer when manufacturing the vehicle.

2. The method of claim 1, wherein the display visually indicates for at least one of the vehicle option fields that the selectable indicator is in the selected state where the Original Equipment Manufacturer data indicates that the option corresponding to the particular vehicle option field was not installed on the vehicle by the Original Equipment Manufacturer when manufacturing the vehicle but a visual inspection of the vehicle indicates that the option corresponding to the at least one of the vehicle option fields is installed on the vehicle.

3. The method of claim 1, further comprising decoding the Original Equipment Manufacturer data wherein the decoding comprises using a first linking table to map a first plurality of codes comprising at least some of the Original Equipment Manufacturer data to a second plurality of codes wherein ones of the second plurality of codes are each associated with at least one vehicle option field.

4. The method of claim 2, wherein generating vehicle information data using the Vehicle Identification Number comprises generating data regarding a plurality of options that the vehicle may or may not have, and wherein the method further comprises comparing ones of the second plurality of codes with the vehicle information data to identify at least some of the plurality of options that are present on the vehicle and at least some of the plurality of options that are not present on the vehicle.

5. The method of claim 1, wherein the method further comprises:
receiving input indicating that ones of the vehicle options from among the vehicle options fields that are displayed with the selectable indicator in the selected state are damaged on the vehicle;
calculating a cost of repair based on the vehicle options that are indicated as damaged.

6. The method of claim 5, wherein calculating a cost of repair comprises:
retrieving repair cost data for ones of the vehicle options that are indicated as damaged on the vehicle, the repair cost data comprising a part cost and a labor cost associated with each of the ones of the vehicle options indicated as damaged; and
determining an estimate for the repair of the vehicle using the repair cost data.

7. The method of claim 5, further comprising:
calculating an estimated total value for the vehicle based on the vehicle option fields indicated as present on the vehicle by at least one of the Original Equipment Manufacturer codes;
causing to be displayed on the display an indication that the car exceeds a totaled value of the vehicle if the calculated cost of repair exceeds a percentage of the estimated total value for the vehicle.

8. The method of claim 1, further comprising:
calculating an estimated total value for the vehicle based on the vehicle option fields indicated as present on the vehicle by at least one of the Original Equipment Manufacturer codes;
causing to be displayed on the display the estimated total for the value of the vehicle.

9. The method of claim 1, wherein the display visually indicates for at least one of the vehicle option fields that the selectable indicator is in the de-selected state where the Original Equipment Manufacturer data indicates that the option corresponding to the particular vehicle option field was installed on the vehicle by the Original Equipment Manufacturer when manufacturing the vehicle but a visual inspection of the vehicle indicates that the option corresponding to the at least one of the vehicle option fields is not installed on the vehicle.

10. The method of claim 1, wherein the display visually indicates for at least one of the vehicle option fields that the selectable indicator is in the de-selected state where the vehicle information data indicates that the option corresponding to the particular vehicle option field was included in the vehicle but the Original Equipment Manufacturer data indicates that the option corresponding to the particular vehicle option field was not installed on the vehicle by the Original Equipment Manufacturer when manufacturing the vehicle.

11. A non-transitory computer readable storage medium comprising logic configured, when executed by a processor, to:
generate vehicle information data using a Vehicle Identification Number, wherein the vehicle information data comprises at least the make of the vehicle, the model of the vehicle, and at least one option package associated with the make and model of the vehicle;
generate a request for Original Equipment Manufacturer data regarding the vehicle using the Vehicle Identification Number, the Original Equipment Manufacturer data comprising a plurality of Original Equipment Manufacturer codes wherein ones of the plurality of Original Equipment Manufacturer codes each represent options that were installed by an Original Equipment Manufacturer when manufacturing the vehicle;
cause to be displayed on a display an identification of the make of the vehicle and the model of the vehicle;
cause to be displayed on the display a plurality of vehicle option fields, wherein at least some of the vehicle option fields each comprise at least a selectable indicator and an option description, where the selectable indicator is operable to visually indicate a selected or deselected state for a vehicle option, and wherein the option description comprises a description of at least one option that the Original Equipment Manufacturer offered for the make and model of the vehicle;
wherein the display visually indicates for ones of the vehicle option fields that the selectable indicator is in the selected state where Original Equipment Manufacturer data indicates that the option corresponding to the particular vehicle option field was installed on the vehicle by the Original Equipment Manufacturer when manufacturing the vehicle, wherein the option corresponding to the particular vehicle option field is indicated as present on the vehicle by at least one of the Original Equipment Manufacturer codes;
wherein the display visually indicates for ones of the vehicle option fields that the selectable indicator is in the deselected state where the Original Equipment Manufacturer data indicates that the option corresponding to the particular vehicle option field was not installed on the vehicle by the Original Equipment Manufacturer when manufacturing the vehicle.

12. The non-transitory computer readable medium of claim 11, wherein the display visually indicates for at least ones of the vehicle option fields that the selectable indicator is in the selected state where the Original Equipment Manufacturer data indicates that the option corresponding to the particular vehicle option field was not installed on the vehicle by the Original Equipment Manufacturer when manufacturing the vehicle but a visual inspection of the vehicle indicates that the option corresponding to the at least one of the vehicle option fields is installed on the vehicle.

13. The non-transitory computer readable medium of claim 11, the logic further configured to decode the Original Equipment Manufacturer data wherein the decoding comprises using a first linking table to map a first plurality of codes comprising at least some of the Original Equipment Manufacturer data to a second plurality of codes wherein ones of the second plurality of codes are each associated with at least one vehicle option code.

14. The non-transitory computer readable medium of claim 12, wherein generating vehicle information data using the Vehicle Identification Number comprises generating data regarding a plurality of options that the vehicle may or may not have, and wherein the logic is further configured to compare ones of the second plurality of codes with the vehicle information data to identify at least some of the plurality of options that are present on the vehicle and at least some of the plurality of options that are not present on the vehicle.

15. The non-transitory computer readable medium of claim 11, the logic further configured to calculate, based on received input indicating that ones of the vehicle options from among the vehicle options fields that are displayed with the selectable indicator in the selected state are damaged on the vehicle, a cost of repair.

16. The non-transitory computer readable medium of claim 15, wherein calculate a cost of repair comprises:
retrieve repair cost data for ones of the vehicle options that are indicated as damaged on the vehicle, the repair cost data comprising a part cost and a labor cost associated with each of the ones of the vehicle options indicated as damaged; and
determine an estimate for the repair of the vehicle using the repair cost data.

17. The non-transitory computer readable medium of claim 15, the logic further configured to:
calculate an estimated total value for the vehicle based on the vehicle option fields indicated as present on the vehicle by at least one of the Original Equipment Manufacturer codes;
cause to be displayed on the display an indication that the car exceeds a totaled value of the vehicle if the calculated cost of repair exceeds a percentage of the estimated total value for the vehicle.

18. The non-transitory computer readable medium of claim 11, the logic further configured to:
calculate an estimated total value for the vehicle based on the vehicle option fields indicated as present on the vehicle by at least one of the Original Equipment Manufacturer codes;
cause to be displayed on the display the estimated total for the value of the vehicle.

19. The non-transitory computer readable medium of claim 11, wherein the display visually indicates for at least one of the vehicle option fields that the selectable indicator is in the de-selected state where the Original Equipment Manufacturer data indicates that the option corresponding to the particular vehicle option field was installed on the vehicle by the Original Equipment Manufacturer when manufacturing the vehicle but a visual inspection of the vehicle indicates that the option corresponding to the at least one of the vehicle option fields is not installed on the vehicle.

20. The non-transitory computer readable medium of claim 11, wherein the display visually indicates for at least one of the vehicle option fields that the selectable indicator is in the de-selected state where the vehicle information data indicates that the option corresponding to the particular vehicle option field was included in the vehicle but the Original Equipment Manufacturer data indicates that the option corresponding to the particular vehicle option field was not installed on the vehicle by the Original Equipment Manufacturer when manufacturing the vehicle.

21. A system comprising:
a display;
a memory;
a hardware processor communicatively coupled to the memory, the hardware processor operable to:
generate vehicle information data using a Vehicle Identification Number, wherein the vehicle information data comprises at least the make of the vehicle, the model of the vehicle, and at least one option package associated with the make and model of the vehicle;
generate a request for Original Equipment Manufacturer data regarding the vehicle using the Vehicle Identification Number, the Original Equipment Manufacturer data comprising a plurality of Original Equipment Manufacturer codes wherein ones of the plurality of Original Equipment Manufacturer codes each represent options that were installed by an Original Equipment Manufacturer when manufacturing the vehicle;
cause to be displayed on a display an identification of the make of the vehicle and the model of the vehicle;
cause to be displayed on the display a plurality of vehicle option fields, wherein at least some of the vehicle option fields each comprise at least a selectable indicator and an option description, where the selectable indicator is operable to visually indicate a selected or deselected state for a vehicle option, and wherein the option description comprises a description of at least one option that the Original Equipment Manufacturer offered for the make and model of the vehicle;
wherein the display visually indicates for ones of the vehicle option fields that the selectable indicator is in the selected state where Original Equipment Manufacturer data indicates that the option corresponding to the particular vehicle option field was installed on the vehicle by the Original Equipment Manufacturer when manufacturing the vehicle, wherein the option corresponding to the particular vehicle option field is indicated as present on the vehicle by at least one of the Original Equipment Manufacturer codes;
wherein the display visually indicates for ones of the vehicle option fields that the selectable indicator is in the deselected state where the Original Equipment Manufacturer data indicates that the option corresponding to the particular vehicle option field was not installed on the vehicle by the Original Equipment Manufacturer when manufacturing the vehicle.

22. The system of claim 21, wherein the display visually indicates for ones of the vehicle option fields that the selectable indicator is in the selected state where the Original Equipment Manufacturer data indicates that the option corresponding to the particular vehicle option field was not installed on the vehicle by the Original Equipment Manufacturer when manufacturing the vehicle and the vehicle information data indicates that the option corresponding to the particular option field is installed on the vehicle.

23. The system of claim 21, wherein the hardware processor is further configured to receive the Original Equipment Manufacturer data by:
comparing the Vehicle Identification Number to a first linking table to identify an Original Equipment Manufacturer code, wherein the first linking table maps Original Equipment Manufacturer codes to Vehicle Identification Numbers; and
comparing the identified Original Equipment Manufacturer code with a second linking table to identify at least one option that was installed by an Original Equipment Manufacturer when manufacturing the vehicle, wherein the second linking table maps Original Equipment Manufacturer codes to a description of an associated vehicle option.

24. The system of claim 21, wherein the hardware processor is further configured to calculate a cost of repair based on an indication that that ones of the vehicle options from among the vehicle options fields that are displayed with the selectable indicator in the selected state is damaged on the vehicle, wherein the cost is calculated based on the vehicle options that are damaged.

25. The system of claim 24, wherein calculate a cost of repair comprises:
compare the ones of the vehicle options that are indicated as damaged on the vehicle with a linking table to identify a part cost and a labor cost for repairing the option, wherein the linking table maps a description of a vehicle option to a part cost for the option and a labor cost for repairing the option; and
determine the sum of the identified part costs and labor costs.

26. The system of claim 24, wherein the hardware processor is further configured to:
calculate an estimated total value for the vehicle based on the vehicle option fields indicated as present on the vehicle by at least one of the Original Equipment Manufacturer codes;
cause to be displayed on the display an indication that the car exceeds a totaled value of the vehicle if the calculated cost of repair exceeds a percentage of the estimated total value for the vehicle.

27. The system of claim 21, wherein the hardware processor is further configured to:
calculate an estimated total value for the vehicle based on the vehicle option fields indicated as present on the vehicle by at least one of the Original Equipment Manufacturer codes;
cause to be displayed on the display the estimated total for the value of the vehicle.

28. The system of claim 21, wherein the display visually indicates for at least one of the vehicle option fields that the selectable indicator is in the de-selected state where the Original Equipment Manufacturer data indicates that the option corresponding to the particular vehicle option field was installed on the vehicle by the Original Equipment Manufacturer when manufacturing the vehicle but a visual inspection of the vehicle indicates that the option corresponding to the at least one of the vehicle option fields is not installed on the vehicle.

29. The system of claim 21, wherein the display visually indicates for at least one of the vehicle option fields that the selectable indicator is in the de-selected state where the vehicle information data indicates that the option corresponding to the particular vehicle option field was included in the vehicle but the Original Equipment Manufacturer data indicates that the option corresponding to the particular vehicle option field was not installed on the vehicle by the Original Equipment Manufacturer when manufacturing the vehicle.

* * * * *